United States Patent
Karmel (10) Patent No.: US 8,396,656 B1
(45) Date of Patent: Mar. 12, 2013

(54) METHOD AND SYSTEM FOR LATENT TRACKING OF VESSELS VIA A MESH NETWORK

(75) Inventor: Clayton R. Karmel, San Diego, CA (US)

(73) Assignee: Pdicta Corporation, San Diego, CA (US)

( * ) Notice: Subject to any disclaimer, the term of this patent is extended or adjusted under 35 U.S.C. 154(b) by 336 days.

(21) Appl. No.: 12/753,604

(22) Filed: Apr. 2, 2010

Related U.S. Application Data (60) Provisional application No. 61/170,665, filed on Apr. 20, 2009.

(51) Int. Cl.
*G01C 21/00* (2006.01)

(52) U.S. Cl. ..................................................... 701/408
(58) Field of Classification Search .................. 701/207
See application file for complete search history.

(56) References Cited

U.S. PATENT DOCUMENTS

| | | | |
|---|---|---|---|
| 6,204,808 B1 | 3/2001 | Bloebaum et al. | |
| 6,240,365 B1 | 5/2001 | Bunn | |
| 6,327,533 B1 | 12/2001 | Chou | |
| 6,658,349 B2 | 12/2003 | Cline | |
| 6,904,364 B2 | 6/2005 | Randazzo | |
| 6,968,185 B2 | 11/2005 | Chitrapu et al. | |
| 7,050,819 B2 | 5/2006 | Schwengler et al. | |
| 7,260,369 B2 | 8/2007 | Feher | |
| 7,271,736 B2 | 9/2007 | Siegel et al. | |
| 2004/0015293 A1* | 1/2004 | Randazzo et al. | 701/213 |
| 2004/0193367 A1 | 9/2004 | Cline | |
| 2007/0268155 A1 | 11/2007 | Holmes et al. | |
| 2008/0036587 A1* | 2/2008 | Meinzen et al. | 340/539.13 |

* cited by examiner

*Primary Examiner* — Thomas H. Tarcza
*Assistant Examiner* — Maceeh Anwari
(74) *Attorney, Agent, or Firm* — Clause Eight IPS; Michael Catania (57) ABSTRACT

A device, system and method for latent tracking of vessels via a mesh network is disclosed herein. The device includes a microcontroller, a mesh radio, a memory, a GPS receiver and a power supply. The microcontroller is configured to determine when the device is within range and out of range of a mesh network. The memory is configured for storing latent information about the vessel. The GPS receiver receives GPS signals and provides the GPS signals to determine GPS data for the vessel which is transmitted over the mesh radio when the device is within range of the mesh network and stored as latent GPS data in the memory when the device is out of range of the mesh network.

17 Claims, 13 Drawing Sheets

FIG. 3C https:// www.tigertrax.com/sdregatta

San Diego Regatta
Real Time Race Results

Race Time: 05:25:03

Real-time: 13:30:31

| Data | 50b | 50c | 50d | 50e | 50f |
|---|---|---|---|---|---|
| Mesh Status | + | + | + | + | + |
| Last Transmission Time | 5:25:03 | 5:25:03 | 5:25:03 | 5:25:03 | 5:25:03 |
| Velocity (Knots) | 5 | 5.5 | 6 | 6.5 | 7 |
| Heading | SW | SW | W | SW | SW |
| GPS Location | N0034/ E0033 | N0034/ E0033 | N0034/ E0033 | N0034/ E0033 | N0034/ E0033 |
| Race Position | 6 | 4 | 3 | 2 | 1 |
| Vessel Information LENGTH | 30 | 30 | 30 | 30 | 40 |

FIG. 4 https:// www.tigertrax.com/sdregatta

San Diego Regatta
Real Time Race Results

Race Time: 05:35:09          Real-time: 13:40:40

| Data | 50b | 50c | 50d | 50e | 50f |
|---|---|---|---|---|---|
| Mesh Status | + | + | + | + | - |
| Last Transmission Time | 5:35:09 | 5:35:09 | 5:35:09 | 5:35:09 | 5:25:03 |
| Velocity | 5 | 5 | 5 | 5.5 | 7 |
| Heading | SW | SW | W | SW | SW |
| GPS Location | N0034/ E0033 | N0034/ E0033 | N0034/ E0033 | N0034/ E0033 | N0034/ E0033 |
| Race Position | 6 | 4 | 3 | 2 | 1 |
| Vessel Information TYPE | Cutter | Sloop | Sloop | Sloop | Cutter |

FIG. 4A

| https:// www.tigertrax.com/sdregatta |

| San Diego Regatta Real Time Race Results |

| Race Time: 05:45:02 | Real-time: 13:50:43 |

| Data | 50b | 50c | 50d | 50e | 50f |
|---|---|---|---|---|---|
| Mesh Status | + | + | + | + | + |
| Last Transmission Time | 5:45:02 | 5:45:02 | 5:45:02 | 5:45:02 | 5:45:02 |
| Velocity | 5 | 5.5 | 5 | 5.5 | 6.5 |
| Heading | SW | SW | W | SW | S |
| GPS Location | N0034/ E0033 | N0034/ E0033 | N0034/ E0033 | N0034/ E0033 | N0034/ E0033 |
| Race Position | 6 | 4 | 3 | 2 | 1 |
| Vessel Information RATING | | | | | |

METHOD AND SYSTEM FOR LATENT TRACKING OF VESSELS VIA A MESH NETWORK

CROSS REFERENCE TO RELATED APPLICATION

The Present Application claims priority to U.S. Provisional Patent Application No. 61/170,665, filed Apr. 20, 2009, which is hereby incorporated by reference in its entirety.

STATEMENT REGARDING FEDERALLY SPONSORED RESEARCH OR DEVELOPMENT

Not Applicable

BACKGROUND OF THE INVENTION

1. Field of the Invention

The present invention is generally related to methods and systems for tracking vessels. More specifically, the present invention relates to latent tracking of vessels using a mesh network.

2. Description of the Related Art

The tracking of vessels using GPS is known in the prior art. Various wireless communication formats are known for wireless transmitting information. Examples include Wireless Local Access Network (WLAN) standards such as IEEE 802.11, 802.15.4, and derivatives thereof. Various cellular based communication formats are also known. Other wireless communications standard or specification may also be deployed. Example cellular-based data systems include: (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in "TR-45.5 Physical Layer Standard for cdma2000 Spread Spectrum Systems" (the IS-2000 standard), and (4) the high data rate (HDR) system that conforms to the TIA/EIA/IS-856 standard (the IS-856 standard). Other wire replacement formats, such as Bluetooth, are known. Optical formats may also be utilized, including infrared, such as detailed by the Infrared Data Association (IrDA).

The Global Positioning System (GPS) is a satellite based navigation system operated and maintained by the United States Government. GLONASS is a Russian controlled satellite constellation providing substantially the same location functionality as GPS. Differential Satellite Navigation Systems (DSNS), such as Differential GPS (dGPS) and Differential GLONASS (dGLONASS), utilize a strategy to improve the accuracy of GPS position determination information. It is based on the determination that the main sources of positional error in GPS are approximately equal over very large areas. DSNS use a comparison between the actual known position of a reference receiver and the position of the reference receiver calculated from the satellite system to determine what correction is necessary to reduce satellite system calculated position errors, known as pseudo-range errors, in the general vicinity of the reference receiver. For example, dGPS and DGLONASS systems use reference receivers at surveyed locations. These reference receivers are programmed with the surveyed location information. They then receive signals from the satellites and calculate the position from that information. The reference receivers then establish the difference between their surveyed position and the calculated position (the pseudo range error) and broadcast the corrections that allow roving receivers in the region to correct the position calculations for the pseudo-range errors. This allows for the removal of the negative results that SA, the ionosphere and troposphere and other error sources can have on positional accuracy. A nonproprietary broadcast standard for this error-correcting information is RTCM SC-104 Version 2.

The prior art discloses various systems and methods for tracking vessels.

Bloebaum et al., U.S. Pat. No. 6,204,808 for a Method And System For Aiding GPS Receivers Via A Cellular Or PCS Network discloses providing GPS navigational location information to a mobile station over a wireless network.

Bunn, U.S. Pat. No. 6,240,365 for an Automated Vehicle Tracking And Service Provision System discloses using a GPS receiver with a cellular network to track an automobile.

Chou, U.S. Pat. No. 6,327,533 for a Method And Apparatus For Continuously Locating An Object discloses tracking an object using GPS with satellite communications and wireless network communications.

Cline, U.S. Pat. No. 6,658,349 for a Method And System For Marine Vessel Tracking System discloses tracking movements of a ship using GPS receivers and satellite communications that are periodically transmitted to a monitoring station.

Randazzo et al., U.S. Pat. No. 6,904,364 for a Navcell Peer To Peer GPS discloses a system that uses a GPS system with linked vessel to vessel communications that form a communications mesh to transmit only real-time current location messages for a vessel along the communication mesh to a display device.

Chitrapu et al., U.S. Pat. No. 6,968,185 for a Mobile Wireless Presence And Situation Management System And Method discloses a system where a user can indicate the user's availability to receive a communication such as a telephone call.

Schwengler et al., U.S. Pat. No. 7,050,819 for a Mesh Network Mobile Unit With Positioning System discloses a system that can receive unit positioning location information using GPS and transmit information over a mesh network.

Feher, U.S. Pat. No. 7,260,369 for a Location Finder, Tracker, Communication And Remote Control System discloses a device that uses two RF bands for communication and positioning the location of the device.

Siegel et al., U.S. Pat. No. 7,271,736 for an Emergency Vehicle Alert System discloses a line of site transceiver that can communicate an emergency signal from one emergency vehicle to another emergency vehicle.

Holmes et al., U.S. Patent Publication Number 2007/0268155 for a Position Tracking And Proximity Warning System discloses a system that uses mesh nodes on a truck to track the position of the truck using a mesh network.

Meinzen et al., U.S. Patent Publication Number 2008/0036587 for a Race Tracking System And Method discloses a system for generating a real-time map of objects based on GPS coordinates received from the objects.

The idea of tracking sailboats is not new. The tracking of sailboats has been done via on-board GPS for a number of years. Before GPS, the tracking of sailboats was done with Loran or paper charts. Also, the tracking of most if not all boats in a race is not novel. AMERICA'S CUP racing has been tracked for years with GPS and wide area or local area wireless communications. Currently, a company called KAT- TACK (kattack.com) offers the ability to track fleets of race boats and provides immediate viewing on a Web-enabled desktop application, with track and parametric data and animation of races.

The KATTACK system requires each skipper to place a GPS handheld device into a "holster" on the stern of the sailboat to activate the GPS handheld device just before racing starts. The GPS handheld device is then returned to an authorized "publisher" for upload to the Web. The information from the KATTACK GPS handheld device is displayed using a Web-enabled (.Net) desktop application. However, .Net applications only run on relatively recent Microsoft personal computers and do not support LINUX, MacOS, IPHONE or other smart phones.

Marathon runners have been tracked with RFID technology which highlights when each runner has passed a certain checkpoint. However, this type of marathon runner tracking does not provide information on the track in between the checkpoints. Further, motorcycles used to track and photograph the lead runners utilize GPS but only via "point-to-point" two-way connections.

Wireless mesh networking is being aggressively pursued by many levels of technology. "WiFi" or "WiMax" mesh technology mostly revolve around the idea of wireless ISP (WISP), the idea that a coverage area for internet access points can be inexpensively expanded.

BRIEF SUMMARY OF THE INVENTION

The present invention provides a solution to the problems of the prior art. The present invention is easy to install, easy to use, and is compatible with all major browsers (MOZILLA, INTERNET EXPLORER, SAFARI). The device of the present invention is intended to be installed once, with no wiring, and with self powering features. The device of the present invention also communicates without human intervention, and the results are visible on an animated Web page, compatible with any browser supporting JavaScript. No additional software needs to be downloaded by average users of the present invention.

Using the present invention, sailors can view their own boat's track along with the tracks of their racing competitors, highlighting boat performance, wind shifts and tactical (boat to boat) situations. The present invention is also applicable to cars, shipping containers, heavy equipment and other mobile assets where knowledge of the asset's position or status is just as valuable as the real-time condition or location of the asset.

One aspect of the present invention is a device for monitoring and communicating track and other data for a vessel. The device includes a microcontroller, a mesh radio, a memory, a GPS receiver and a power supply. The microcontroller is configured to determine when the device is within range of a mesh network and configured to determine when the device is isolated from the mesh network. The mesh radio is connected to the microcontroller for transmitting data to the mesh network. The memory is in communication with the microcontroller and configured for storing latent information about the device. The GPS receiver is in communication with the microcontroller. The GPS receiver receives GPS signals and provides the GPS signals to the microcontroller for processing to determine GPS data for the vessel which is transmitted over the mesh radio when the device is within range of the mesh network and stored as latent GPS data in the memory when the device is isolated from the mesh network for transmission at a time of subsequent connection to the mesh network. The power supply is connected to at least the microcontroller for supplying power to the device.

The device optionally includes a USB interface wherein the device is a gateway for the mesh network for connection to the Internet when an Internet connected USB cable is connected to the device at the USB interface. The device optionally includes a solar panel for powering at least the GPS receiver. The vessel is preferably a sail boat. The device optionally includes a housing containing the microcontroller, the memory, the GPS receiver, the mesh radio and the power supply. The housing preferably has a diameter ranging from 2.5 inches to 5.0 inches, and a height ranging from 0.25 inch to 1.0 inch. The GPS data preferably comprises time, position, velocity, heading and a date. The mesh radio preferably transmits utilizing a 802.15.4 communication protocol. The mesh radio preferably is a relay for a second device in a mesh network, and a third device in the mesh network is a USB connected device that is a gateway to the Internet.

A routing discovery behavior of the device in the mesh network is controlled by the gateway. The mesh radio is preferably configured to form dual networks. A first network for nearby mesh nodes attached to the vessel, and a second network for communication between other vessels in motion relative to one another and the gateway. A device is preferably attached to each mark of a race course and collects track information from a plurality of racing vessels for storage and relay to a gateway, as well as identifying the position of the mark. The device preferably stores vessel information comprising at least one of vessel length, vessel type, vessel rating, vessel name, vessel owner, vessel owner settings, placement of the device on the vessel, vessel speed, wind speed, apparent wind angle, true wind angle, depth, water temperature, race start time and heel angle.

Another aspect of the present invention is a system for tracking and monitoring vessels. The system includes a plurality of devices, a gateway and a Web site. Each device of the plurality of devices includes a microcontroller, a mesh radio, a memory, a GPS receiver and a power supply. The microcontroller is configured to determine when the device is within range of a mesh network and configured to determine when the device is isolated from the mesh network. The mesh radio is connected to the microcontroller for transmitting data to the mesh network. The memory is in communication with the microcontroller and configured for storing latent information about the device. The GPS receiver is in communication with the microcontroller. The GPS receiver receives GPS signals and provides the GPS signals to the microcontroller for processing to determine GPS data for the vessel which is transmitted over the mesh radio when the device is within range of the mesh network and stored as latent GPS data in the memory when the device is isolated from the mesh network for transmission at a time of subsequent connection to the mesh network. The power supply is connected to at least the microcontroller for supplying power to the device. The gateway connects to the Internet. The Web site is in communication with the gateway over the Internet. The first set of the plurality of devices forms a mesh network for transmitting and receiving GPS data and vessel data for each of the vessels which is transmitted to the gateway for transmission to the Web site for display on a Web page of the Web site.

The system also preferably includes a user interface connected to at least one of a second set of the plurality of devices for receiving information from the network and for acting as a gateway. Each of the plurality of devices is preferably configured to disconnect from the mesh network when the vessel travels out of range of any of the other plurality of devices wherein the GPS data for the out-of-range device is stored in the memory of the out-of-range device, and wherein each of the plurality of devices is configured to reconnect to the mesh network when the out-of-range device is again in range of at least one of the other plurality of devices. Each of the plurality of devices further includes a housing containing the microcontroller, the memory, the GPS receiver, the mesh radio and the power supply, with the housing having a diameter ranging from 2.5 inches to 5.0 inches, and a height ranging from 0.25 inch to 1.0 inch. The GPS data for each of the vessels, such as for a boat, comprises at least one of time, position, velocity, heading, a date, vessel length, vessel type, vessel rating, vessel name, vessel owner, vessel owner settings, placement of the device on the vessel, vessel speed, wind speed, apparent wind angle, true wind angle, depth, water temperature, race start time and heel angle. The mesh radio of each of the plurality of devices preferably transmits utilizing an 802.15.4 communication protocol. Each of the plurality of devices can further include a solar panel for self-powering at least the GPS receiver. Each of a second set of the plurality of devices is not associated with a vessel, and the second set of the plurality of devices acts as an Internet gateway for the mesh network.

Yet another aspect of the present invention is a method for tracking and monitoring boats on the water. The method includes establishing a mesh network comprising a plurality of devices. Each device of the plurality of devices includes a microcontroller, a mesh radio, a memory, a GPS receiver and a power supply. The microcontroller is configured to determine when the device is within range of a mesh network and configured to determine when the device is isolated from the mesh network. The mesh radio is connected to the microcontroller for transmitting data to the mesh network. The memory is in communication with the microcontroller and configured for storing latent information about the device. The GPS receiver is in communication with the microcontroller. The GPS receiver receives GPS signals and provides the GPS signals to the microcontroller for processing to determine GPS data for the vessel which is transmitted over the mesh radio when the device is within range of the mesh network and stored as latent GPS data in the memory when the device is isolated from the mesh network for transmission at a time of subsequent connection to the mesh network. The power supply is connected to at least the microcontroller for supplying power to the device. The method also includes receiving a signal from at least one of the plurality of devices at another of the plurality of devices, the signal containing GPS data for the boat and an identification of the boat. The method also includes transmitting the signal through the mesh network to a tracking and monitoring engine.

Preferably, transmitting the signal through the mesh network to a tracking and monitoring engine comprises transmitting the signal from the mesh network to an unassociated device in communication with a user interface which is in communication with the tracking and monitoring engine over the Internet.

The method further includes a device of the plurality of devices disconnecting from the mesh network when the boat associated with the device travels out of range of any of the other plurality of devices, and the memory storing the GPS data for the out-of-range device while the device is not connected to the mesh network. The method further includes the out-of range device reconnecting to the mesh network when the boat associated with the device travels in range of at least one of the other plurality of devices and transmitting the stored GPS data from the out-of-range device over the mesh network to the tracking and monitoring engine.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

As shown in FIGS. 1, 1A, 1B, 1C and 2, a device for tracking and monitoring vessels is generally designated 20. The device 20 has a housing 21 for securing and protecting various electrical components. A solar energy panel 22 is preferably located in a center of a top surface of the device 20. The solar energy panel 22 provides a source power to the device 20.

Figure 1:
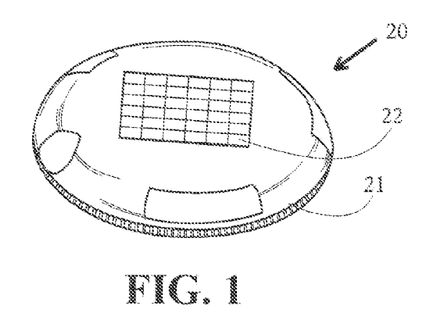
FIG. 1 is a top perspective of a device used for tracking and monitoring vessels.
Figure 1A:
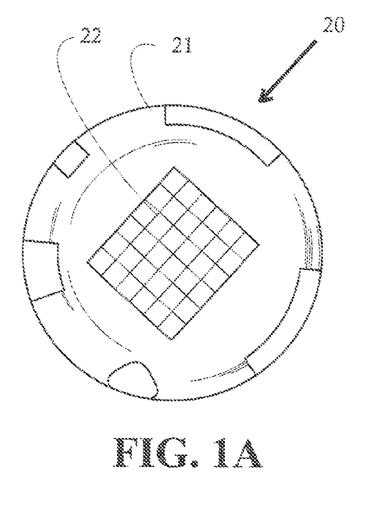
FIG. 1A is a top plan view of the device of FIG. 1.
Figure 1B:
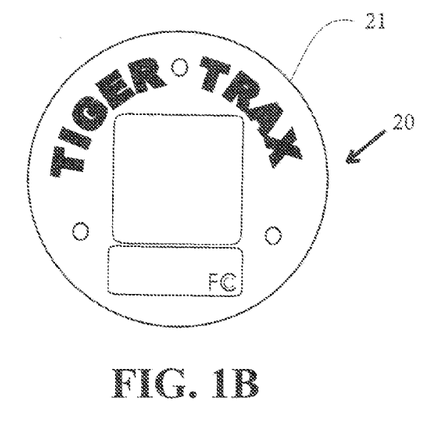
FIG. 1B is a bottom plan view of the device of FIG. 1.
Figure 1C:
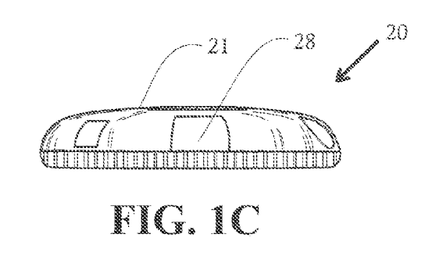
FIG. 1C is a front side view of the device of FIG. 1.
Figure 2:
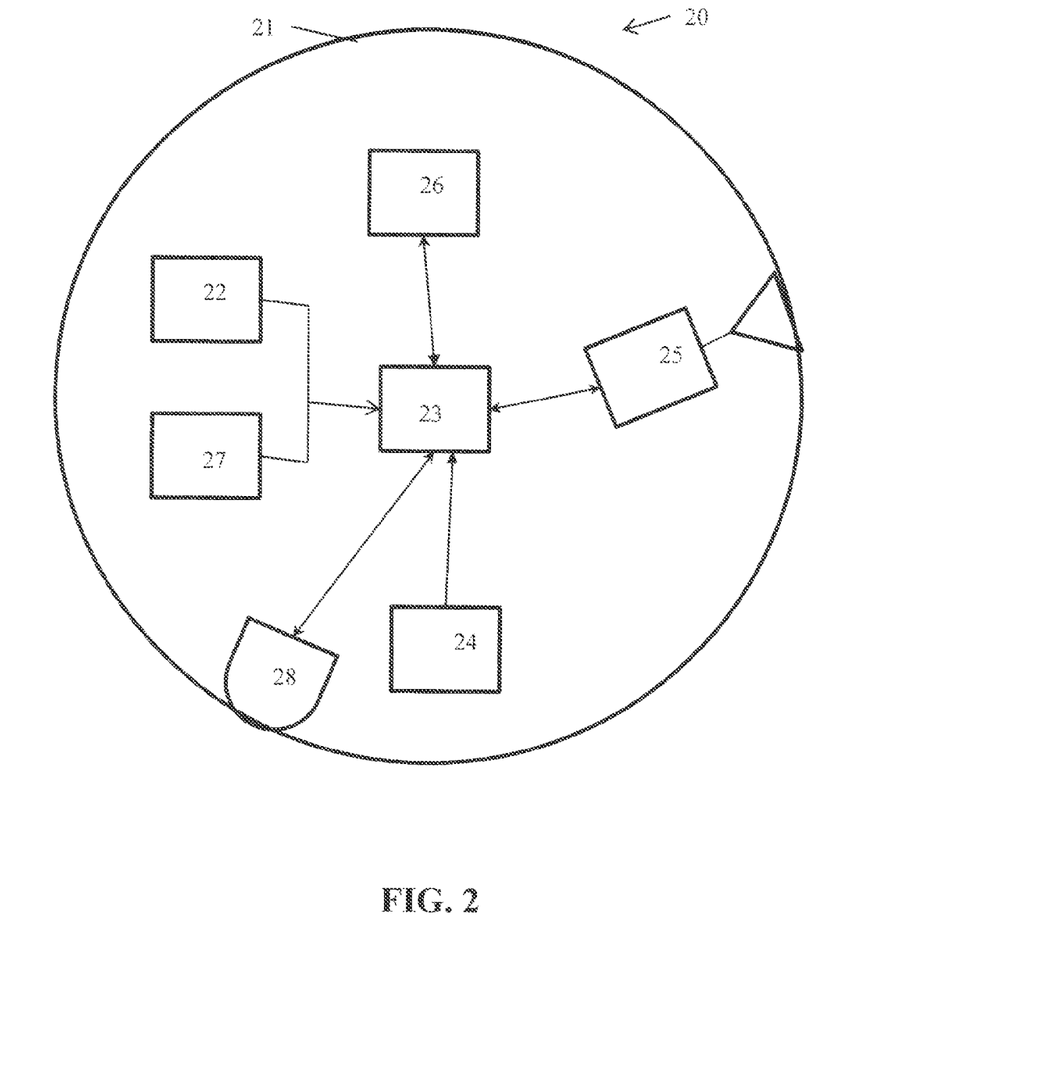
FIG. 2 is a block diagram of the components of the device of FIG. 1.

As shown in FIG. 2, the device 20 preferably has a microcontroller 23, a GPS receiver 24, a mesh radio 25, a memory 26, a battery and regulator circuit 27 and an USB interface 28. The memory 26 is preferably a non-volatile memory which may include flash memory, Electronic Erasable Programmable Read Only Memory (EEPROM), Flash memory, battery backed RAM, Read Only Memory (ROM) or any other non-volatile memory. The memory 25 is preferably used for storing vessel data as well as other parameters and variables. Any type of memory configuration, techniques of which are well known in the art, may be deployed.

Figure 3:
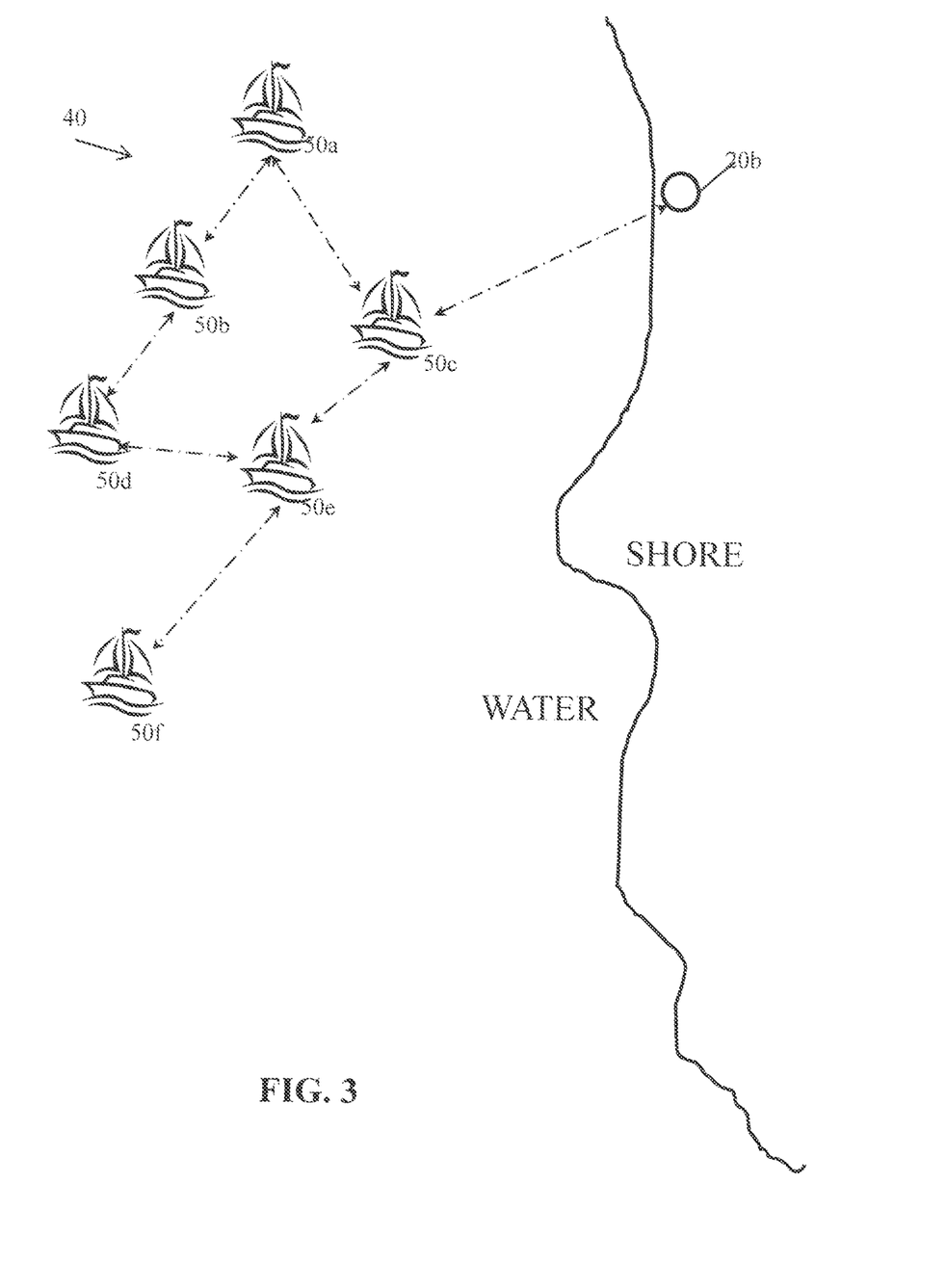
FIG. 3 is a representation of a system for tracking and monitoring vessels at a first time.

As shown in FIG. 3, a system 40 is formed by vessels 50 that form a mesh network of mesh nodes by linking devices 20 that are located on each of the vessels 50. The devices 20 communicate over the mesh network to a gateway device 20b. The gateway device 20b access the Internet to transfer the information to a server 65 for processing. The server 65 processes the information from the vessels 50 and updates a web site for viewing by clients over the Internet.

Figure 3A:
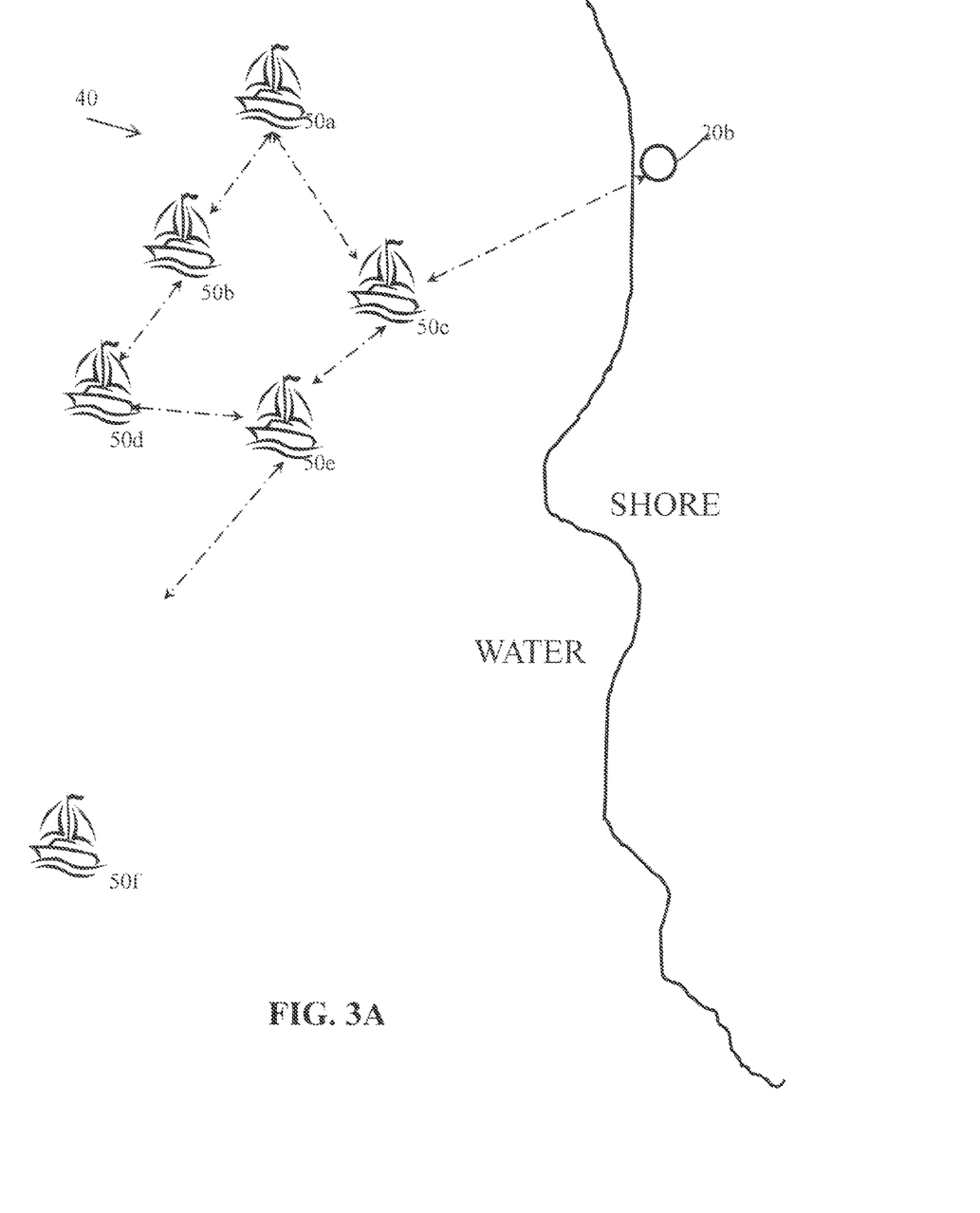
FIG. 3A is a representation of a system for tracking and monitoring vessels at a second time.
Figure 3B:
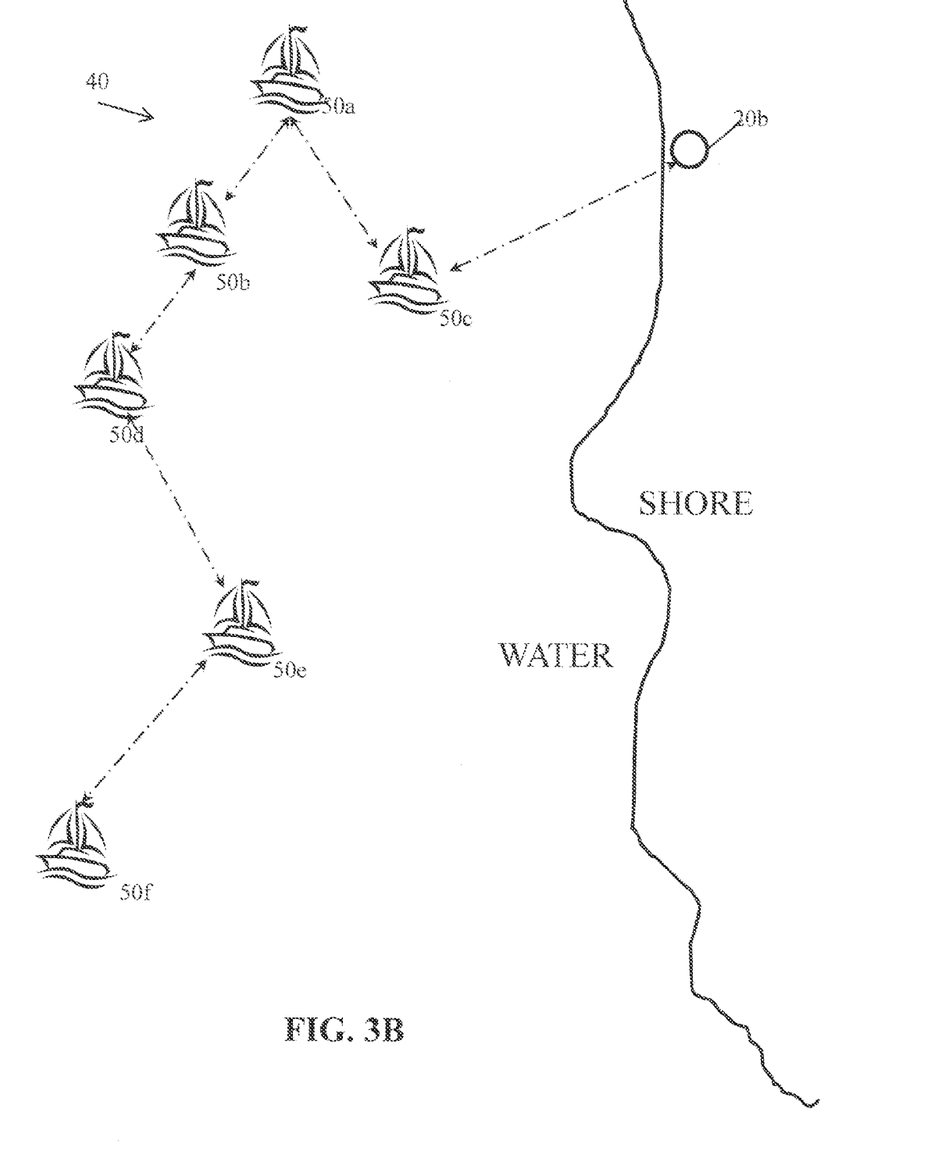
FIG. 3B is a representation of a system for tracking and monitoring vessels at a third time.
Figure 3C:
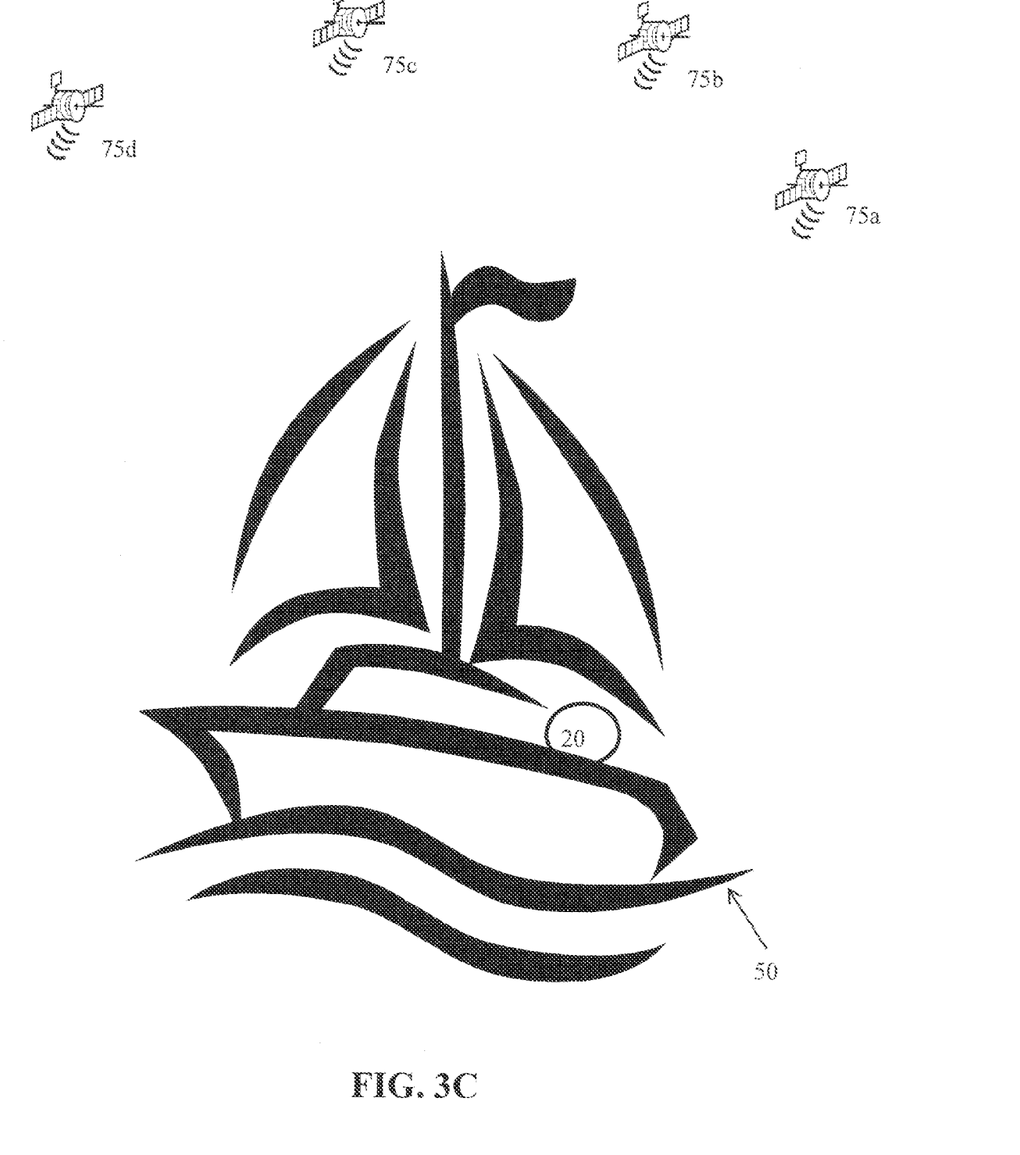
FIG. 3C is an isolated view of a vessel and four GPS satellites.

An isolated view of a vessel 50 is shown in FIG. 3C. The vessel 50 has a device 20 attached to the port side of the vessel 50. The device 20, as described above, receives signals from the GPS satellites 75 which allow the device 20 to determine a real-time position for the vessel 50.

Figure 4:
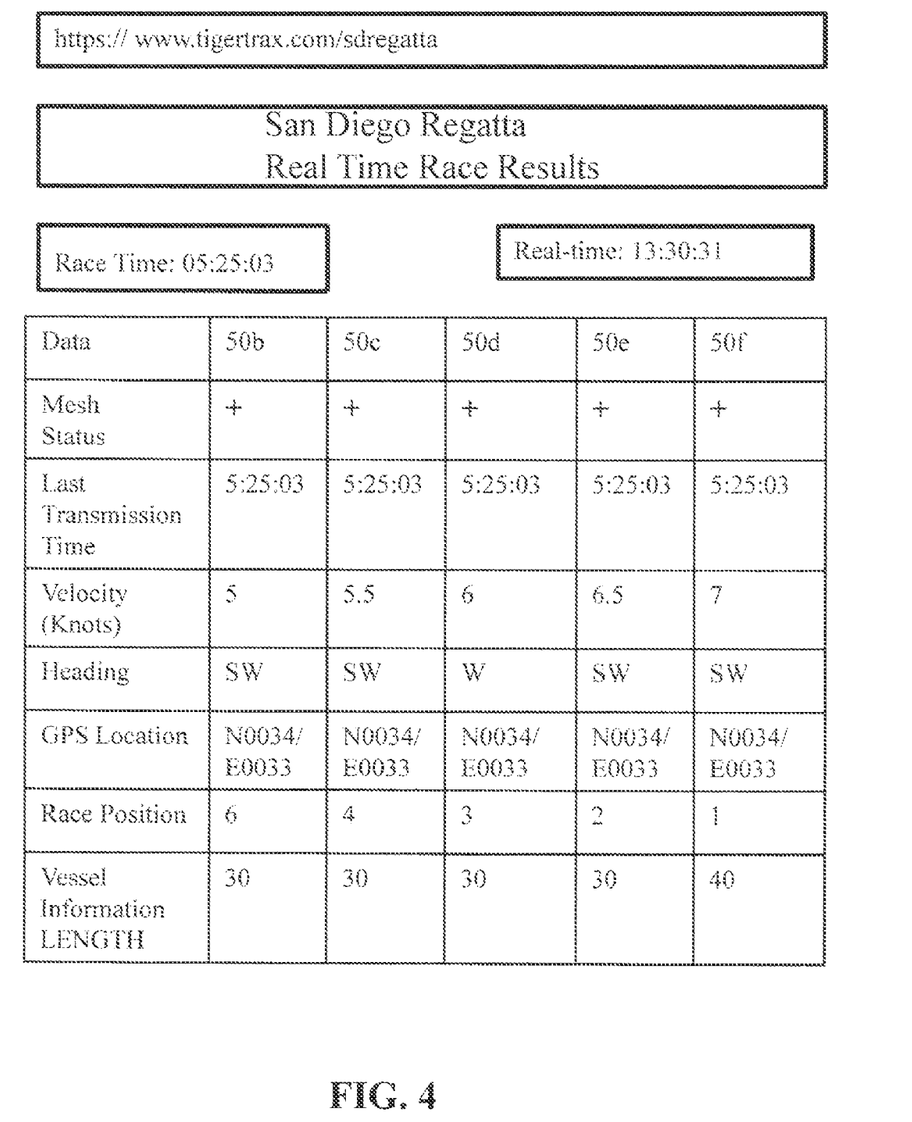
FIG. 4 is a Web page of a Web site for tracking and monitoring vessels with a table of results at a first time.

As shown in FIG. 4, a Web page 80 has a display 81 of race information. The Web page 80 may be accessible to the public or may only be accessible to certain users. The reenactment of real time data is provided in box 82 and the elapsed race time is provided in box 83. The information in FIG. 4 corresponds to a first time, which is 13:30:31 in real time and 05:25:03 in elapsed race time. FIG. 3 illustrates the vessels at the first time. At the first time, all of the vessels 50 are within range of the mesh network and can transmit data in real time.

Figure 4A:
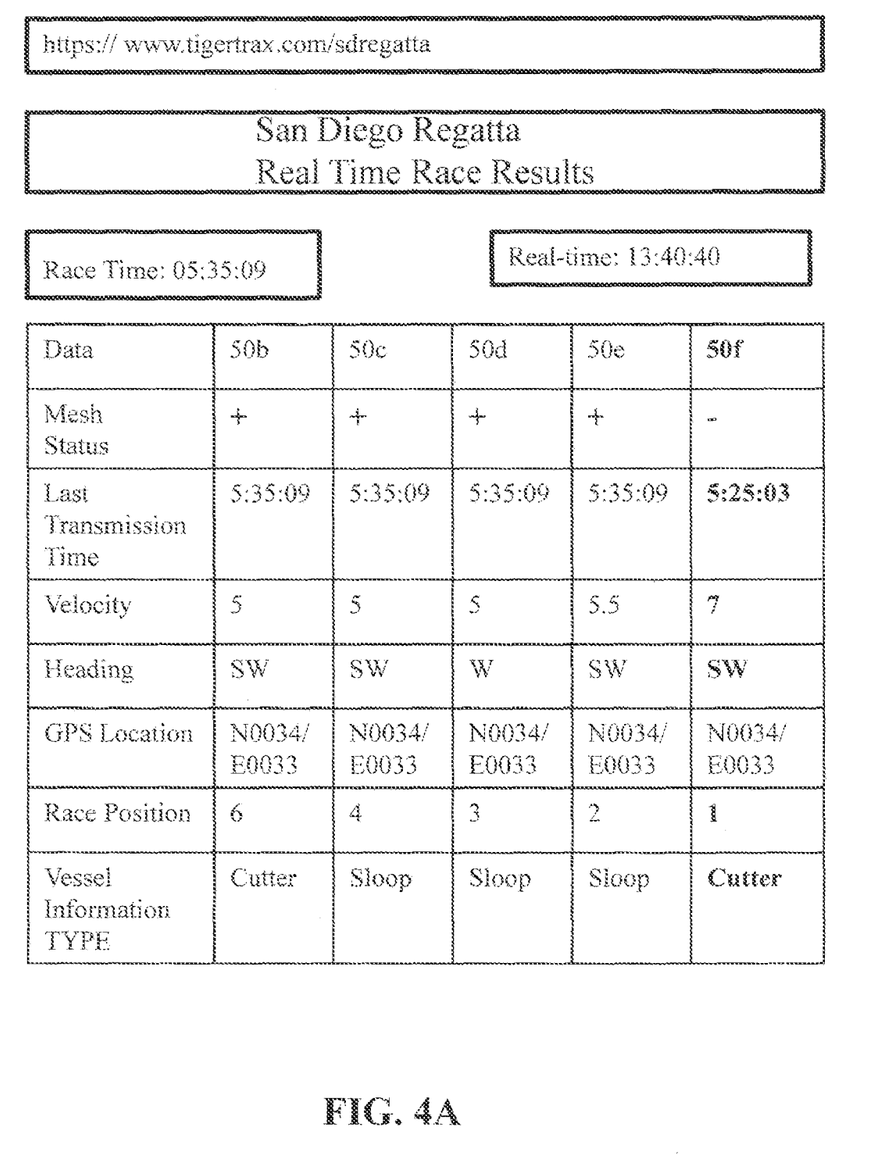
FIG. 4A is a Web page of a Web site for tracking and monitoring vessels with a table of results at a first time.

The information in FIG. 4A corresponds to a second time, which is 13:40:40 in real time and 05:35:09 in elapsed race time. FIG. 3A illustrates the vessels at the second time. At the second time, vessel 50f is outside of the range of the mesh network and thus it cannot transmit real-time data. Instead the data is stored in the memory until a later time when vessel 50f is again within range of the mesh network. As shown in FIG. 4A, vessel information type is provided in the variable last row of the table. Other vessel types include Melges 24; Etchells; 5o5; Laser; Thistle; Beneteau First 36.7; J105' J120; and Flying Tiger.

Figure 4B:
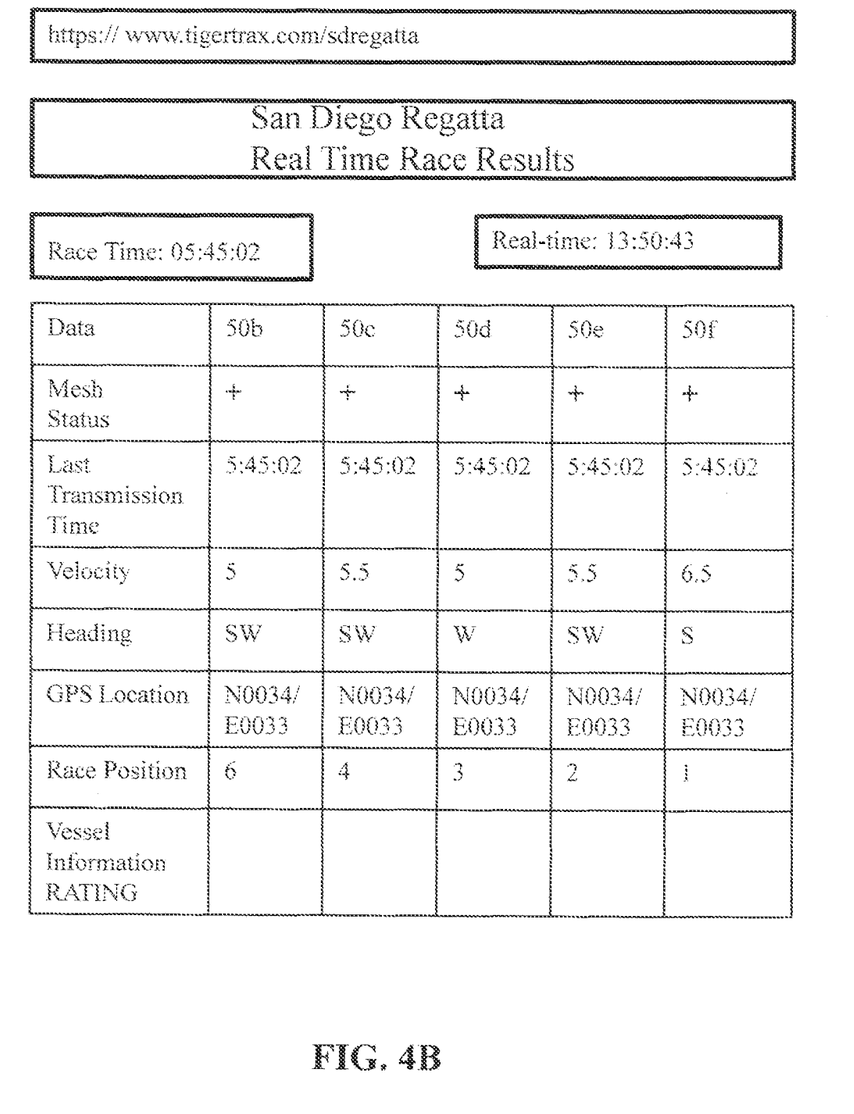
FIG. 4B is a Web page of a Web site for tracking and monitoring vessels with a table of results at a third time.

The information in FIG. 4B corresponds to a third time, which is 13:50:43 in real time and 05:45:02 in elapsed race time. FIG. 3B illustrates the vessels at the third time. At the third time, all of the vessels 50 are again within range of the mesh network and can transmit data in real time. Vessel 50f transmits data over the mesh network including real-time data and the stored data from the second time.

Figure 5:
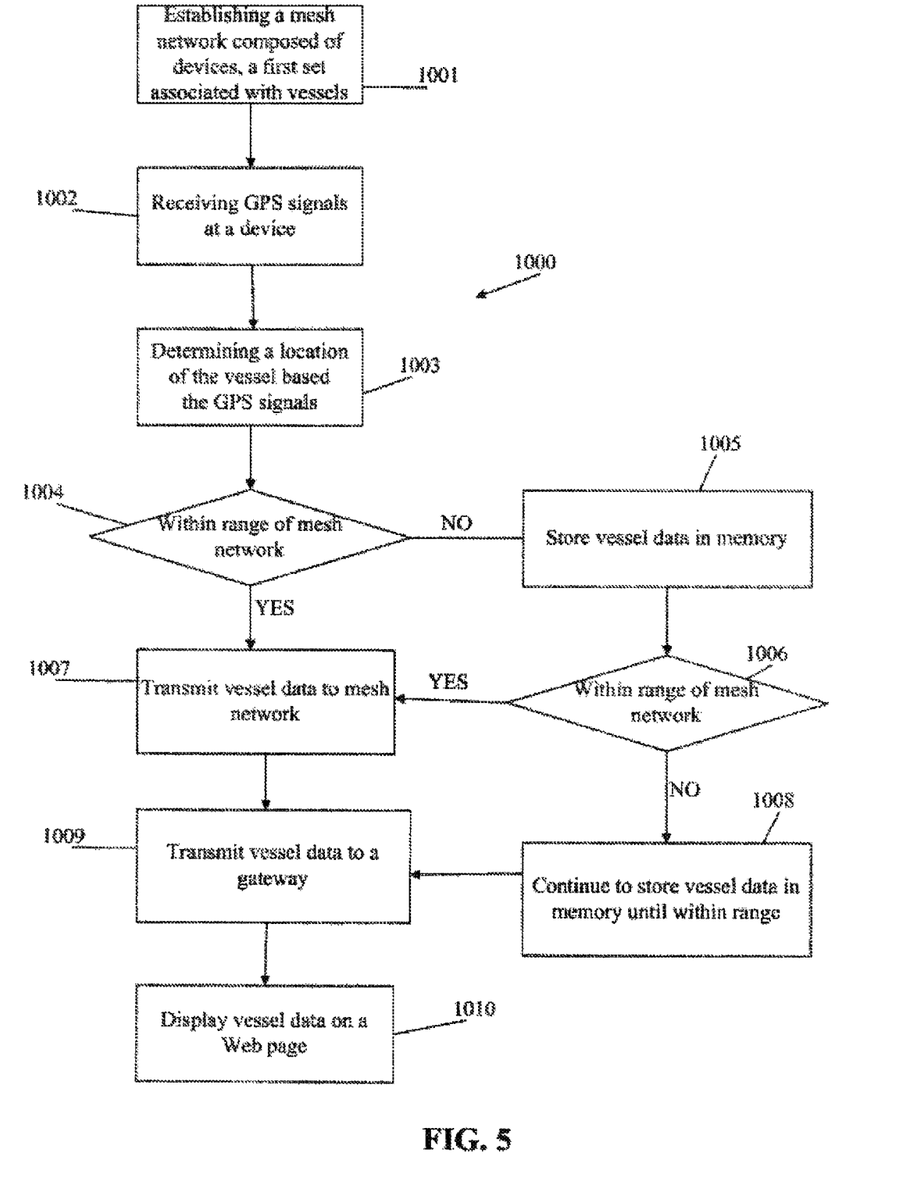
FIG. 5 is a flow chart of a method for tracking and monitoring vessels.

FIG. 5 illustrates a flow chart of method 1000 for tracking and monitoring vessels. At block 1001, a mesh network composed of a plurality of a first set of devices 20 is established using the mesh radio 25 of each of the devices 20. Each device 20 of the first set of devices 20 is associated with a specific vessel 50. Each mesh radio 25 acts like a mesh node in the mesh network. The communication format is preferably IEEE 802.25.4. Mesh networks typically consist of a plurality of mesh nodes, each mesh node having a unique identifier (unique to the network). The mesh nodes are deployed and preferably automatically establish communication links there between, for example as described using the Ad hoc On Demand Distance Vector (AODV) routing algorithm, Zigbee, and other routing algorithms known in the art. Once the mesh network is configured (either automatically or manually), a mesh node sends data to another non-adjacent node by first transmitting the data to an adjacent mesh node, which transmits the data to another node, etc., until the data reaches its destination. In this example, a mesh network is considered to be set up when each mesh node knows (in a routing table located locally or remotely) how to transmit data to other mesh nodes. The mesh network alternatively also periodically tests links and updates the routing tables on one or more mesh nodes if the network has changed (for example, a mesh node was removed or a link is broken). In this manner, the mesh network is made reliable, even if for only brief periods as nodes move into and out of range of one another.

At block 1002, the GPS receiver 24 of the device 20 receives GPS signals from the GPS satellites 75 (as shown in FIG. 3C) for determining a position location of the vessel 50. At block 1003, a location for the vessel 50 is determined using the GPS signals and vessel data including GPS data is created by the microcontroller 23. At decision 1004, the device 20 inquires if the mesh radio 25 is within range of the mesh network. If the response is NO, then at block 1005, the vessel data is stored in the memory 26 of the device 20. At block 1006, the device 20 continues to inquire if the mesh radio 25 of the device 20 is within range of the mesh network. The range between mesh nodes is using an IEEE 802.15.4 communication format is preferably up to one mile, more preferably up to a quarter mile, and most preferably ranges from 1000 feet to a quarter of a mile.

Returning to decision 1004, if the response is YES, then at block 1007, the vessel data is transmitted along the mesh network. Returning to decision 1006, if the response is YES, then at block 1007, the vessel data is transmitted along the mesh network. If the response is NO, then at block 1008, the vessel data is continued to be stored in the memory 26 of the device 20. In a preferred embodiment, the mesh network preferably supports up to ten links between a mesh node and the gateway device 20b. At block 1009, the vessel data is transmitted to a gateway device 20b for transmission over the Internet to a server 65 for processing. At block 1010, the vessel data is displayed on a Web page of a Web site.

Figure 6:
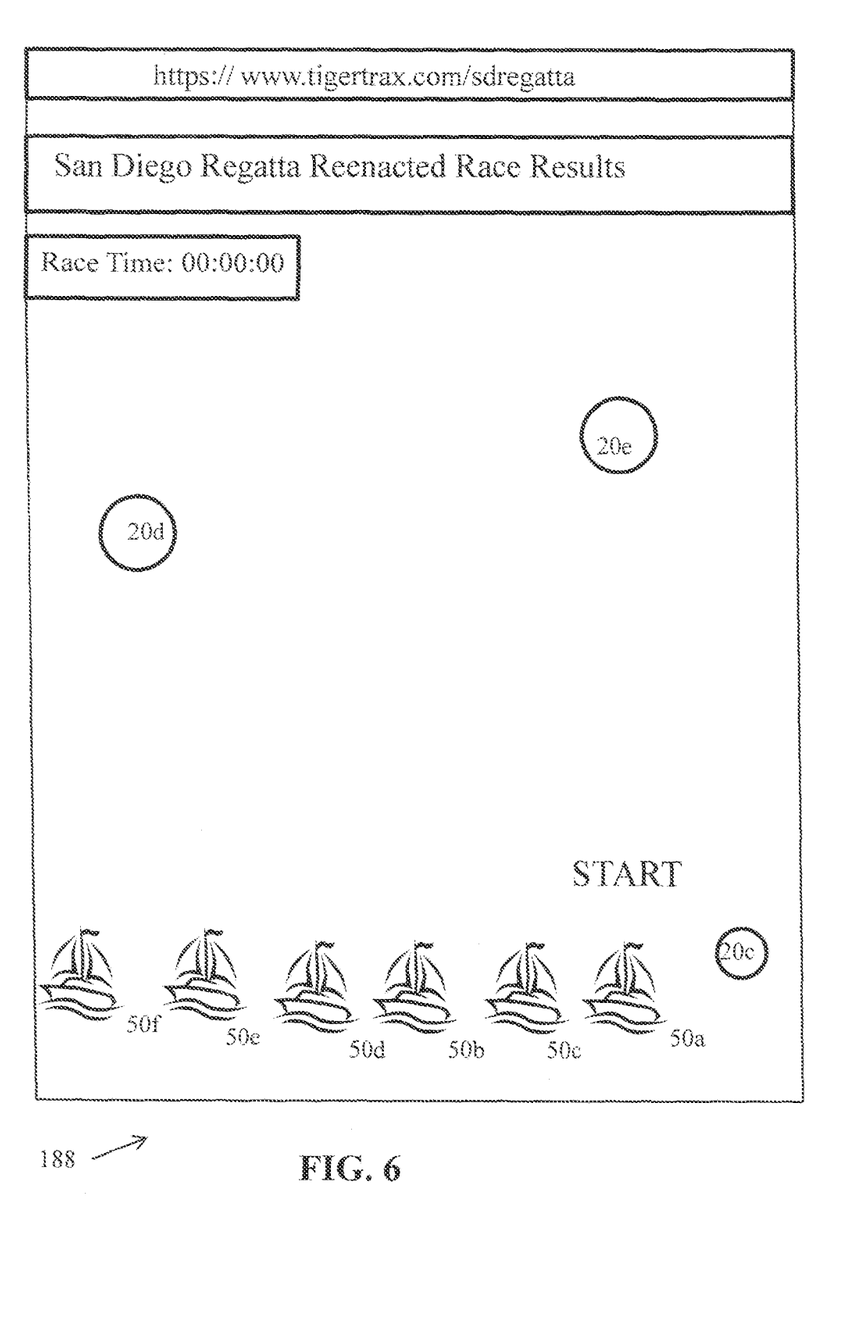
FIG. 6 is a Web page of a reenactment of a race at a beginning of the race.
Figure 6A:
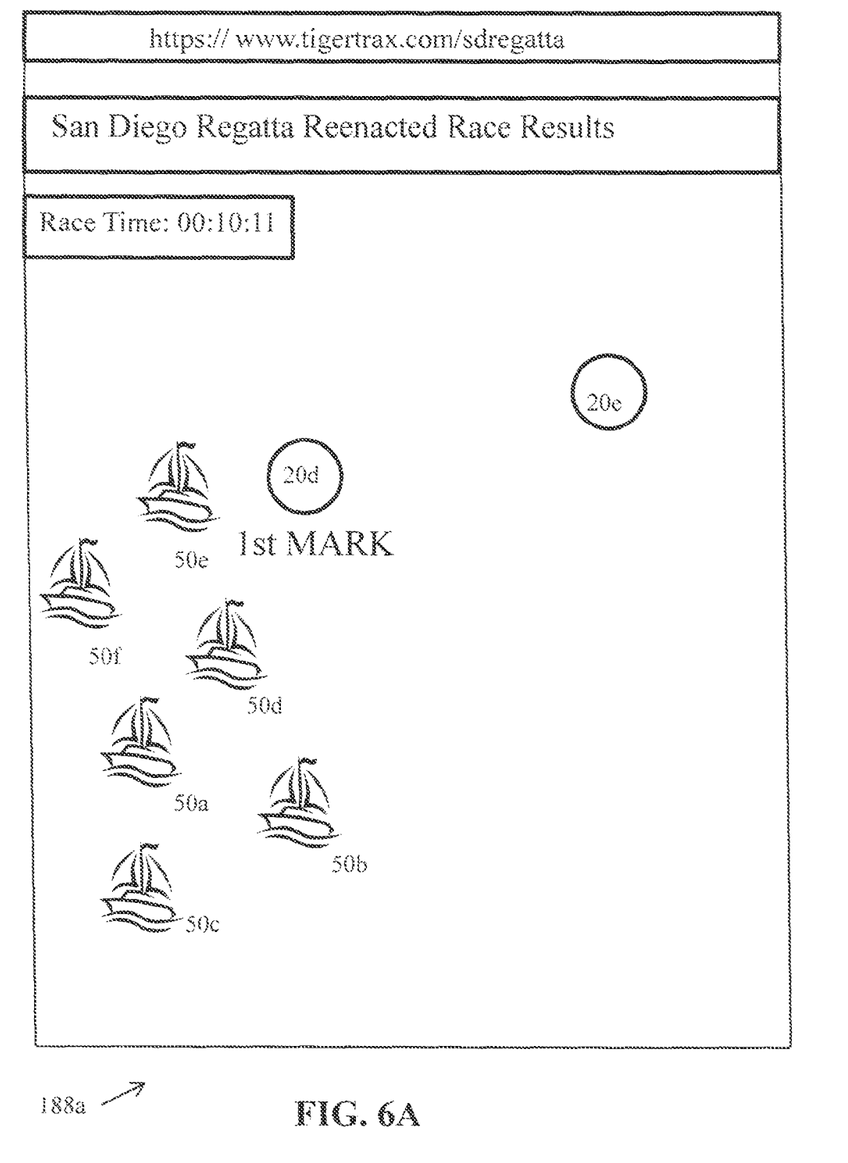
FIG. 6A is a Web page of a reenactment of a race at a first mark.
Figure 6B:
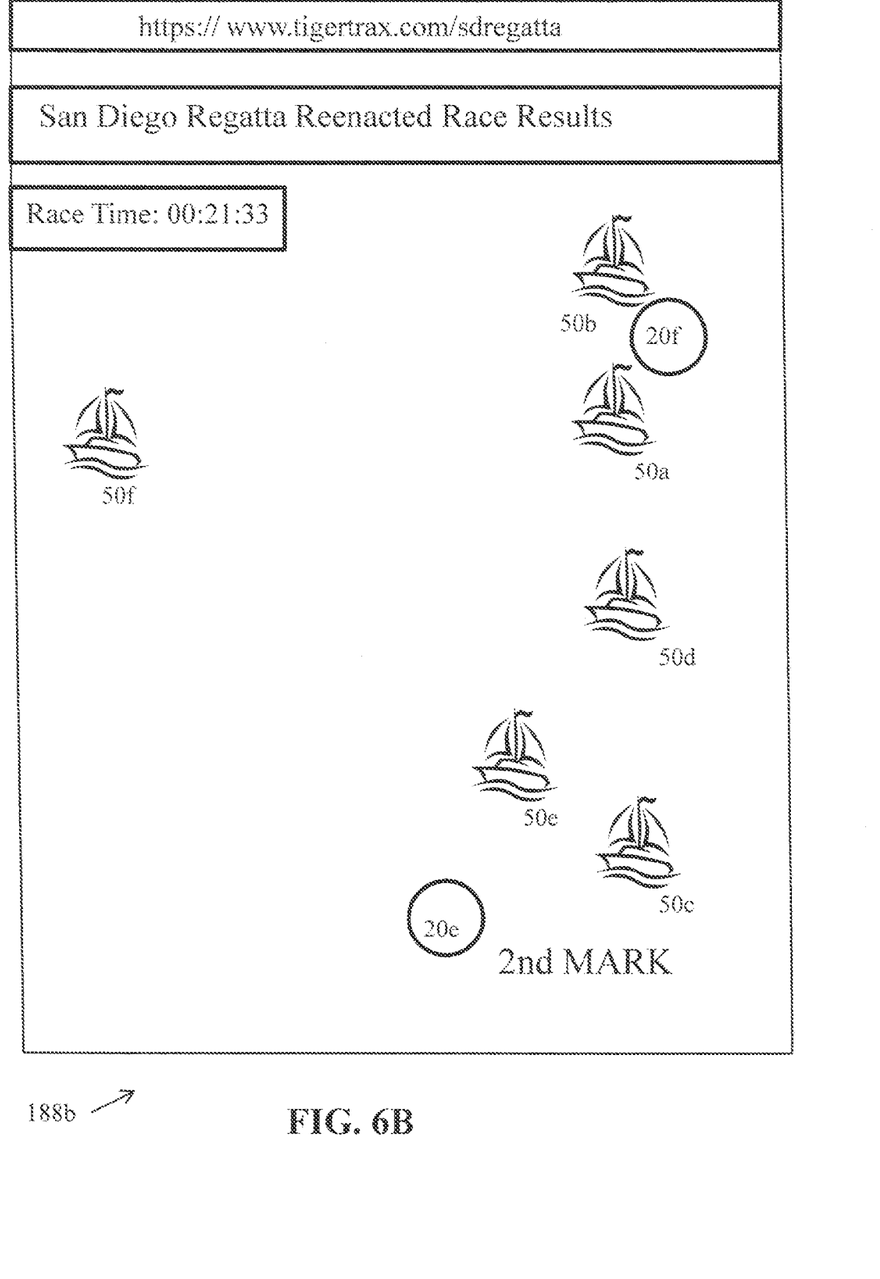
FIG. 6B is a Web page of a reenactment of a race at a second mark.

FIGS. 6, 6A and 6B illustrate Web pages of a reenactment of a race. During the reenactment, information for a vessel that was out of range of a mesh network in real-time is entered in the reenactment for a continuous display of the positioning of the vessel 50. For example, in FIG. 6B, vessel 50f is outside of range of the mesh network established by the other vessels 50 and devices 20d and 20e located at marks along the race. In a real-time display of the race, vessel 50f would not be seen in the display since there would be no real-time information since vessel 50f is out of range of the mesh network at race time 00:21:33. However, the device 20 associated with vessel 50f allows the vessel information, including GPS data, to be stored in the memory for transmission on the mesh network when vessel 50f is again in range of the mesh network.

A primary focus of the method, system and device is laconic information, and in particular the ability to replay a race. A Web site would preferably show a virtual map of the race course, with vessels positioned on it, playing back at ½×, 1×, 2×, 5× or 10× speeds. In a most preferred embodiment, the Web site has the following: auto-zooming to highlight near passes or other tactically interesting details; a list of the members; a list of the racing parameters of the members including best-to-worst position rank, average speed, and average tack angle (shown graphically as "polars" as well as numerically); controls for selecting members, defining race marks and race start/stop times, fleet name; and race number connection to personal or administrative controls (ability to adjust personal preferences about data sharing, or boat details). The Web site is preferably mostly graphical, and highly animated.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

I claim as my invention:

1. A device for monitoring and communicating track and other data for a vessel, the device comprising:

a microcontroller, the microcontroller configured to determine when the device is connected to a mesh network and configured to determine when the device is not connected to the mesh network;

a mesh radio connected to the microcontroller for transmitting data to the mesh network;

a memory in communication with the microcontroller, the memory configured for storing latent information about the device;

a GPS receiver in communication with the microcontroller, the GPS receiver receiving GPS signals and providing the GPS signals to the microcontroller for processing to determine GPS data for the vessel which is transmitted over the mesh radio in real time when the device is connected to the mesh network and stored as latent GPS data in the memory when the device is not connected to the mesh network for transmission at a time of subsequent connection to the mesh network; and a power supply connected to at least the microcontroller for supplying power to the device;

wherein the mesh radio is configured to transmit a signal comprising GPS data for the vessel through the mesh network to a tracking and monitoring engine;

wherein the device is configured to disconnect from the mesh network when the vessel travels out of range of any of a plurality of other devices of the mesh network, wherein the GPS data for the device is stored in the memory of the device as latent GPS data when the device disconnects from the mesh network, and wherein the device is configured to reconnect to the mesh network when the device is again in range of at least one of the plurality of other devices, wherein the latent GPS data is transmitted through the mesh network to the tracking and monitoring engine when the device reconnects.

2. The device according to claim 1 further comprising an USB interface, wherein the device is a gateway for the mesh network for connection to the Internet when an Internet connected USB cable is connected to the device at the USB interface.

3. The device according to claim 1 further comprising a solar panel for powering at least the GPS receiver.

4. The device according to claim 1 wherein the device is attached to a mark of a race course and collects track information from a plurality of racing vessels for storage and relay to a gateway.

5. The device according to claim 1 further comprising a housing, the housing containing the microcontroller, the memory, the GPS receiver, the mesh radio and the power supply, the housing having a diameter ranging from 2.5 inches to 5.0 inches, and a height ranging from 0.25 inch to 1.0 inch.

6. The device according to claim 1 wherein the GPS data comprises time, position, velocity, heading and a date.

7. The device according to claim 1 wherein the device stores vessel information comprising at least one of vessel length, vessel type, vessel rating, vessel name, vessel owner, vessel owner settings, placement of the device on the vessel, vessel speed, wind speed, apparent wind angle, true wind angle, depth, water temperature, race start time and heel angle.

8. The device according to claim 1 wherein the mesh radio is a relay for a second device in a mesh network, and a third device in the mesh network is a USB connected device that is a gateway to the Internet.

9. The device according to claim 8 wherein a routing discovery behavior of the device in the mesh network is controlled by the gateway.

10. The device according to claim 8 wherein the mesh radio is configured to form dual networks, a first network for a plurality of nearby mesh nodes attached to the vessel, and a second network for communication between other vessels in motion relative to one another and the gateway.

11. A system for tracking and monitoring sail boats, the system comprising:

a plurality of devices, each of a first set of the plurality of devices associated with a boat, each of the plurality of devices comprising a microcontroller, the microcontroller configured to determine when the device is within a range of a mesh network and configured to determine when the device is isolated from the mesh network, a mesh radio connected to the microcontroller for transmitting data to and receiving data from the mesh network, a memory in communication with the microcontroller, the memory configured for storing latent information about the device, a GPS receiver in communication with the microcontroller, the GPS receiver receiving GPS signals and providing the GPS signals to the microcontroller for processing to determine GPS data for the vessel which is transmitted over the mesh radio in real time when the device is connected to the mesh network and stored as latent GPS data in the memory when the device is not connected to the mesh network for transmission at a time of subsequent connection to the mesh network, and a power supply connected to at least the microcontroller for supplying power to the device;

a tracking and monitoring engine in communication with the mesh network for receiving GPS data and vessel data for each of the sail boats for tracking and monitoring each of the sail boats;

a gateway for connection to the Internet and in communication with the tracking and monitoring engine; and a Web site in communication with the gateway over the Internet;

wherein the first set of the plurality of devices forms a mesh network for transmitting and receiving GPS data and vessel data for each of the sail boats which is transmitted over the mesh network to the tacking and monitoring engine and to the gateway for transmission to the Web site for display on a Web page of the Web site;

wherein each of the plurality of devices is configured to disconnect from the mesh network when the sail boat travels out of range of any of the other plurality of devices, wherein the GPS data for the out-of-range device is stored in the memory of the out-of-range device as latent GPS data when the device disconnects from the mesh network, and wherein each of the plurality of devices is configured to reconnect to the mesh network when the out-of-range device is again in range of at least one of the other plurality of devices wherein the latent GPS data is transmitted through the mesh network to the tracking and monitoring engine when the device reconnects.

12. The system according to claim 11 further comprising a user interface connected to at least one of a second set of the plurality of devices for receiving information from the network and for acting as a gateway, and each of the second set of the plurality of devices is not associated with a boat, the second set of the plurality of devices acting as an Internet gateway for the mesh network.

13. The system according to claim 11 wherein each of the plurality of devices further comprises a housing, the housing containing the microcontroller, the memory, the GPS receiver, the mesh radio and the power supply, the housing having a diameter ranging from 2.5 inches to 5.0 inches, and a height ranging from 0.25 inch to 1.0 inch.

14. The system according to claim 11 wherein the GPS data for each of the boats comprises at least one of time, position, velocity, heading, a date, vessel length, vessel type, vessel rating, vessel name, vessel owner, vessel owner settings, placement of the device on the vessel, vessel speed, wind speed, apparent wind angle, true wind angle, depth, water temperature, race start time and heel angle.

15. A method for tracking and monitoring boats on the water, the method comprising:

establishing a mesh network comprising a plurality of devices, each of the plurality of devices comprising a microcontroller, the microcontroller configured to determine when the device is connected to a mesh network and configured to determine when the device is not connected to the mesh network, a mesh radio connected to the microcontroller for transmitting data to a mesh network, a memory in communication with the microcontroller, the memory configured for storing latent information about the device, a GPS receiver in communication with the microcontroller, the GPS receiver receiving GPS signals and providing the GPS signals to the microcontroller for processing to determine GPS data for the vessel which is transmitted over the mesh radio in real time when the device is connected to the mesh network and stored as latent GPS data in the memory when the device is not connected to the mesh network for transmission at a time of subsequent connection to the mesh network, and a power supply connected to at least the microcontroller for supplying power to the device;

receiving a signal from at least one of the plurality of devices at another of the plurality of devices, the signal containing GPS data for the boat and an identification of the boat;

transmitting the signal through the mesh network to a tracking and monitoring engine;

disconnecting from the mesh network when the boat associated with the device travels out of range of any of the other plurality of devices, and the memory storing the GPS data for the out-of-range device while the device is not connected to the mesh network as latent GPS data; and reconnecting to the mesh network when the boat associated with the device travels in range of at least one of the other plurality of devices and transmitting the latent GPS data from the out-of-range device over the mesh network to the tracking and monitoring engine.

16. The method according to claim 15 wherein transmitting the signal through the mesh network to a tracking and monitoring engine comprises transmitting the signal from the mesh network to an unassociated device in communication with a user interface which is in communication with the tracking and monitoring engine over the Internet.

17. The method according to claim 15 wherein the GPS data for each of the boats comprises time, position, velocity, heading and a date.

* * * * *